United States Patent [19]

Steck et al.

[11] E Patent Number: Re. 33,467

[45] Reissued Date of Patent: Dec. 4, 1990

[54] INDUCTION SEALING OF PAPERBOARD

[75] Inventors: Robert F. Steck, Bensalem; John L. Baartman, III, Lansdale, both of Pa.

[73] Assignee: International Paper Company, Purchase, N.Y.

[21] Appl. No.: 300,051

[22] Filed: Jan. 23, 1989

Related U.S. Patent Documents

Reissue of:

[64] Patent No.: 4,637,199
Issued: Jan. 20, 1987
Appl. No.: 696,519
Filed: Jan. 30, 1985

[51] Int. Cl.[5] ..... B65B 9/08; B65B 9/22

[52] U.S. Cl. ..... 53/451; 53/373; 53/479; 53/551; 53/DIG. 2; 156/272.4; 156/273.7; 156/275.1; 156/290; 156/308.4; 156/309.6; 219/10.75; 219/10.79

[58] Field of Search ..... 269/139, 151, 152; 156/272.2, 274.4, 274.6, 273.7, 275.1, 290, 292, 308.2, 308.4, 309.6, 379.7, 380.6, 380.8; 219/10.75, 10.79; 53/451, 479, 551, 552, 373, DIG. 2

[56] References Cited

U.S. PATENT DOCUMENTS

| | | | |
|---|---|---|---|
| 513,271 | 1/1884 | Matthews | 269/139 |
| 2,214,944 | 9/1940 | Vogt | 229/7 |
| 2,307,890 | 1/1943 | Lakso | 93/35 |

(List continued on next page.)

FOREIGN PATENT DOCUMENTS

| | | |
|---|---|---|
| 231906 | 6/1963 | Austria . |
| 921565 | 2/1973 | Canada . |
| 981339 | 1/1976 | Canada . |
| 594677 | 3/1934 | Fed. Rep. of Germany . |
| 1027587 | 4/1958 | Fed. Rep. of Germany . |
| 1104422 | 4/1961 | Fed. Rep. of Germany . |
| 1124865 | 3/1962 | Fed. Rep. of Germany . |
| 1146431 | 3/1963 | Fed. Rep. of Germany . |
| 1218332 | 6/1966 | Fed. Rep. of Germany . |

(List continued on next page.)

OTHER PUBLICATIONS

High Frequency Heating Review, vol. 1, No. 8, Lepel High Frequency Laboratories, Inc.

*Primary Examiner*—Michael W. Ball
*Assistant Examiner*—Geoffrey L. Knable
*Attorney, Agent, or Firm*—Robert M. Isackson

[57] ABSTRACT

A method and apparatus for use in form, fill, and seal machines wherein a polyfoil material is compressed between two jaws, one jaw having a secondary induction coil which passes through an electromagnetic field and induces a current in the metallic layer of the polyfoil, to heat and then seal the polyfoil. In a preferred embodiment, a plurality of nonconductive sealing jaws, each containing a secondary induction coil, are mounted on an endless carrying means and a plurality of opposing corresponding rigid pressure jaws are also mounted on an endless carrying means and are arranged so that, as the carrying means advance continuously, each sealing jaw and corresponding pressure jaw contact and compress together facing thermoplastic layers of a polyfoil material and each secondary coil passes through an electromagnetic field to induce a current in the secondary induction coil which in turn induces a current in the area of the metallic foil layer proximate to the secondary induction coil to heat the foil and soften the adjacent thermoplastic materials which, because they are pressed together, will fuse and harden upon cooling. In continuous transverse sealing of a filled polyfoil tube, the pressure jaws may include a knife to sever the seals, the polyfoil tube may be preformed before it is sealed, and the sealing and pressure jaws may have an alignment means to facilitate severing and sealing. The secondary induction coil is preferably an enlongated twin loop coil folded so that one loop is fully subjected to the electromagnetic field and the second loop induces a current in the polyfoil tube.

10 Claims, 7 Drawing Sheets

U.S. PATENT DOCUMENTS

| | | | |
|---|---|---|---|
| 2,448,009 | 8/1948 | Baker | 219/13 |
| 2,448,012 | 8/1948 | Baker | 219/13 |
| 2,479,290 | 8/1949 | Auxier et al. | 154/1 |
| 2,479,375 | 8/1949 | Langer | 219/19 |
| 2,492,530 | 12/1949 | Kriegsheim | 219/47 |
| 2,498,383 | 2/1950 | Story | 219/47 |
| 2,506,626 | 5/1950 | Zottu | 219/47 |
| 2,522,682 | 9/1950 | Lewis | 93/3 |
| 2,535,413 | 12/1950 | Hart et al. | 93/49 |
| 2,542,901 | 2/1951 | Chaffee | 154/42 |
| 2,556,223 | 6/1951 | Schnure, Jr. | 219/13 |
| 2,612,595 | 9/1952 | Warren | 219/47 |
| 2,621,704 | 12/1952 | Langer | 154/42 |
| 2,631,642 | 3/1953 | Richardson et al. | 154/1 |
| 2,666,831 | 1/1954 | Seulen et al. | 219/6 |
| 2,708,649 | 5/1955 | Cunningham | 154/116 |
| 2,715,170 | 8/1955 | Sorensen | 219/10.53 |
| 2,723,517 | 11/1955 | Mittleman | 53/154 |
| 2,738,631 | 3/1956 | Jarund | 53/180 |
| 2,741,079 | 4/1956 | Rausing | 53/180 |
| 2,799,759 | 7/1957 | Blond et al. | 219/10.53 |
| 2,873,344 | 2/1959 | Kocks et al. | 219/10.43 |
| 2,920,173 | 1/1960 | Wastberg | 219/10.53 |
| 2,966,021 | 12/1960 | Lane et al. | 53/182 |
| 2,976,907 | 3/1961 | Harvey et al. | 153/10 |
| 2,998,340 | 8/1961 | Conway et al. | 154/116 |
| 3,006,121 | 10/1961 | Omori | 53/180 |
| 3,027,443 | 3/1962 | Reed et al. | 219/10.69 |
| 3,027,696 | 4/1962 | Leasure | 53/28 |
| 3,052,074 | 9/1962 | Dreeben | 53/182 |
| 3,057,129 | 10/1962 | Meissner | 53/28 |
| 3,063,211 | 11/1962 | Graves | 53/180 |
| 3,063,845 | 11/1962 | Graves | 99/171 |
| 3,109,080 | 10/1963 | Pungs et al. | 219/10.53 |
| 3,140,218 | 7/1964 | Hannon | 156/583 |
| 3,221,469 | 12/1965 | Murray | 53/28 |
| 3,234,072 | 2/1966 | Dreeben | 156/498 |
| 3,293,099 | 12/1966 | Stark | 156/289 |
| 3,300,365 | 1/1967 | Roos | 156/583 |
| 3,300,944 | 1/1967 | Thesing | 53/28 |
| 3,332,036 | 7/1967 | Kappenhagen et al. | 331/173 |
| 3,332,198 | 7/1967 | Thesing | 53/28 |
| 3,335,540 | 8/1967 | Reil et al. | 53/28 |
| 3,367,808 | 2/1968 | Edwards | 156/69 |
| 3,381,441 | 5/1968 | Condo, Jr. et al. | 53/24 |
| 3,391,846 | 7/1968 | White | 229/17 |
| 3,395,261 | 7/1968 | Leatherman et al. | 219/10.61 |
| 3,396,258 | 8/1968 | Leatherman | 219/10.53 |
| 3,424,885 | 1/1969 | Garney et al. | 219/10.53 |
| 3,435,172 | 3/1969 | Emerson | 219/10.75 |
| 3,445,629 | 5/1969 | Stark et al. | 219/388 |
| 3,450,856 | 6/1969 | Buck et al. | 219/10.53 |
| 3,457,132 | 7/1969 | Tuma et al. | 156/515 |
| 3,461,014 | 8/1969 | James | 156/272 |
| 3,462,336 | 8/1969 | Leatherman | 156/272 |
| 3,472,721 | 10/1969 | Abramson et al. | 156/366 |
| 3,522,511 | 8/1970 | Wyslotsky | 321/5 |
| 3,528,867 | 9/1970 | Leatherman | 156/272 |
| 3,530,642 | 9/1970 | Leimert | 53/180 |
| 3,540,971 | 11/1970 | Johanski, Jr. | 156/566 |
| 3,556,887 | 1/1971 | Adcock et al. | 156/272 |
| 3,574,031 | 4/1971 | Heller et al. | 156/273 |
| 3,580,788 | 5/1971 | Gustafson | 156/497 |
| 3,604,880 | 9/1971 | O'Neill | 219/10.53 |
| 3,652,361 | 3/1972 | Leatherman | 156/272 |
| 3,679,509 | 7/1972 | Fielibert | 156/182 |
| 3,707,773 | 1/1973 | Wolfberg et al. | 31/1 |
| 3,723,212 | 3/1973 | Casper | 156/69 |
| 3,730,804 | 5/1973 | Dickey | 156/272 |
| 3,738,892 | 6/1973 | Curcio | 156/380 |
| 3,754,456 | 8/1973 | Andrews et al. | 93/41 |
| 3,808,074 | 4/1974 | Smith et al. | 156/69 |
| 3,837,961 | 9/1974 | Vouillemin | 156/272 |
| 3,864,186 | 1/1975 | Balla | 156/272 |
| 3,874,976 | 4/1975 | MacFarland | 156/515 |
| 3,879,247 | 4/1975 | Dickey | 156/272 |
| 3,883,386 | 5/1975 | Garbini et al. | 156/380 |
| 3,925,633 | 12/1975 | Partridge | 219/10.49 |
| 3,927,297 | 12/1975 | Reil | 219/243 |
| 3,940,305 | 2/1976 | Stenberg | 156/515 |
| 3,948,720 | 4/1976 | Reil | 156/583 |
| 3,955,061 | 5/1976 | Roehrman | 219/10.77 |
| 3,980,515 | 9/1976 | Reil et al. | 156/497 |
| 4,009,068 | 2/1977 | Boussageon | 156/380 |
| 4,009,551 | 3/1977 | Greenawalt et al. | 53/28 |
| 4,034,537 | 7/1977 | Reil et al. | 53/28 |
| 4,060,443 | 11/1977 | Balla | 156/380 |
| 4,067,761 | 1/1978 | Shirley | 156/218 |
| 4,084,999 | 4/1978 | Rucker | 156/466 |
| 4,128,985 | 12/1978 | Simmons | 53/51 |
| 4,160,144 | 7/1979 | Kashyap et al. | 219/10.55 |
| 4,186,044 | 1/1980 | Bradley et al. | 156/273 |
| 4,210,477 | 7/1980 | Gillespie et al. | 156/203 |
| 4,224,494 | 9/1980 | Reboux et al. | 219/9.5 |
| 4,248,653 | 2/1981 | Gerber | 156/272 |
| 4,249,364 | 2/1981 | Kawasaki et al. | 53/550 |
| 4,264,668 | 4/1981 | Balla | 428/195 |
| 4,316,709 | 2/1982 | Petersson et al. | 425/174.8 |
| 4,322,929 | 4/1982 | Neumann | 53/451 |

(List continued on next page.)

U.S. PATENT DOCUMENTS

| | | | |
|---|---|---|---|
| 4,330,351 | 5/1982 | LoMaglio | 156/203 |
| 4,353,196 | 10/1982 | Beer et al. | 53/451 |
| 4,364,220 | 12/1982 | Rausing | 53/411 |
| 4,371,768 | 2/1983 | Pozna | 219/10.53 |
| 4,380,446 | 4/1983 | Dickson et al. | 493/11 |
| 4,387,547 | 6/1983 | Reil | 53/131 |
| 4,391,081 | 7/1983 | Kovacs | 53/436 |
| 4,470,240 | 9/1984 | Torterotot et al. | 53/455 |
| 4,512,138 | 4/1985 | Greenawalt | 53/451 |
| 4,546,596 | 10/1985 | Cherney | 53/451 |
| 4,571,472 | 2/1986 | Pollack et al. | 219/9.5 |

FOREIGN PATENT DOCUMENTS

| | | |
|---|---|---|
| 1247192 | 8/1967 | Fed. Rep. of Germany . |
| 278660 | 2/1970 | Fed. Rep. of Germany . |
| 2014974 | 11/1970 | Fed. Rep. of Germany . |
| 293280 | 9/1971 | Fed. Rep. of Germany . |
| 2131906 | 1/1972 | Fed. Rep. of Germany . |
| 2337939 | 2/1975 | Fed. Rep. of Germany . |
| 2410101 | 9/1975 | Fed. Rep. of Germany . |
| 2515849 | 10/1975 | Fed. Rep. of Germany . |
| 197007 | 8/1980 | Fed. Rep. of Germany . |
| 1120756 | 7/1956 | France . |
| 1247747 | 10/1960 | France . |
| 1368859 | 6/1964 | France . |
| 2227178 | 4/1974 | France . |
| 8100250 | 2/1981 | PCT Int'l Appl. . |
| 463088 | 7/1966 | Switzerland . |
| 269069 | 10/1970 | U.S.S.R. . |
| 1023034 | 3/1966 | United Kingdom . |
| 1161901 | 8/1969 | United Kingdom . |
| 2162460 | 2/1986 | United Kingdom . |

INDUCTION SEALING OF PAPERBOARD

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for sealing paperboard packaging material, a laminate including a layer of metallic foil, an exterior layer of a thermoplastic material, and a layer of paper ("polyfoil"). The thermoplastic layer is utilized as the sealant, and the thermoplastic material of one polyfoil area is fused to the thermoplastic material of a second polyfoil area.

Polyfoils having a metallic foil layer such as aluminum foil, an exterior thermoplastic layer such as polyethylene or polypropylene, and a structural paperboard layer have been used advantageously in making containers for food products and liquid products. Polyfoil is impermeable to liquid, resistant to fatty substances, acids, and the like, and can be sealed to itself by heating and pressing together two facing thermoplastic surfaces so that the thermoplastic material softens and fuses together. Upon removing the heat, the thermoplastic material hardens as one mass, forming a substantially airtight seal, preferably a hermetic seal.

In one commercial practice, a single web of polyfoil paperboard laminate is folded over, heated, and sealed longitudinally to form a tube. The tube is sterilized before, during or after construction, filled with a fluid such as milk or orange juice, and sealed transversely, enveloping the substance in a hermetically sealed, airtight, sterile package. The envelope is then severed from the tube being continuously formed above, through the area seaed, resulting in a discrete package having seals at side, top, and bottom, and a seal at the bottom or end of the tube. The container may then be formed into a parallelepiped or tetrahedal for handling and shipping.

To achieve the seal, the opposing thermoplastic materials must be pressed together, heated, softened, fused, and allowed to cool before the pressure is removed. Several methods of heating the thermoplastic materials have been used. One technique is using radiant heat; heating the thermoplastic by conduction. Typically heater elements are located in the same means that compresses the polyfoil together, for example, resistance welding jaws having Nichrome wire or other resistance element at the pressure surface or heated pressure belts. E.g., U.S. Pat. Nos. 3,940,305 to Stenberg, 3,927,297 and 3,948,720 to Reil, 3,874,976 to McFarland, Jr., 3,140,218 to Hannon, 2,621,704 to Langer and 2,542,901 to Chaffee. Other techniques apply heat radiantly to the plastic, for example, using a quartz lamp and a heat transmitting pressure diaphram as shown in Abramson et al. U.S. Pat. No. 3,472,721. One further technique is to heat the heating element by induction at one location and then move the heated element to a second location where it contacts and heats the thermoplastic material by conduction, e.g., Garbini et al. U.S. Pat. No. 3,883,386.

The use of conduction heating is inefficient for sealing polyfoil. The paperboard layer acts as an insulator and if the heat is too high the paper will ignite before the thermoplastic material has fused. The metallic foil layer acts to dissipate the heat before it reaches the thermoplastic. This results in wasting excessive amounts of energy in heating the paperboard and foil to heat the thermoplastic. Furthermore, some means of cooling the softened thermoplastic while it remains under pressure must often be provided to form an integral seal.

A second technique that has been used with some thermoplastic materials and heat curable adhesives involves heating the material dielectrically; generating an electromagnetic field having a frequency in a range from about 1 MHz to 2.4 GHz, to induce a dielectric current in the material directly. These dielectric currents generate heat that will soften thermoplastic material and activate thermosetting adhesive. Electromagnetic fields for dielectric heating of thermoplastic or thermosetting materials can be generated between electrically conducting endless belts for heating sheets of synthetic resins, e.g., U.S. Pat. Nos. 4,316,709 to Petersson et al., and 2,492,530 to Kriegsheim; or by passing the materials to be heated over openings in waveguides, e.g., U.S. Pat. Nos. 4,060,443 to Balla, 3,109,080 to Pungs et al., and 2,506,626 to Zotto. Microwave energy can also be used to cure heat curable epoxy adhesives, e.g., U.S. Pat. Nos. 4,186,044 to Bradley et al., 4,160,144 to Kayshap et al., 3,707,773 to Wolfberg et al., 3,027,443 to Reed et al., 2,708,649 to Cunningham, 2,631,642 to Richardson et al., 2,612,595 to Warren, 2,479,290 to Auxier et al.

Dielectric heating is not a practicable technique because the thermoplastics used in commercial paperboard polyfoil laminates have low dielectric losses. This makes it difficult to induce a current and requires excessive power to generate strong electromagnetic fields or long exposure periods to adequately heat the thermoplastic layer.

A third technique of heating is by induction; subjecting the compressed polyfoil laminates to an alternating electromagnetic field having a frequency in a range from about 5 KHz to 2 MHz, to induce an eddy current in the area of the metallic foil layers subject to the electromagnetic field. These induced currents generate heat in the foil because of resistance losses and the heat softens the adjacent thermoplastic layers by conduction. Examples of induction heating typically place an induction coil, electrically connected to a high frequency generator, adjacent the area where the current is to be induced. Commercial high frequency generators have powers varying from a few watts to about 30 kw. In some examples, the current is induced in a metallic foil layer adjacent the thermoplastic material e.g., U.S. Pat. Nos. 4,248,653 to Gerger, 3,864,186 to Balla, 3,873,961 to Vouillemin, 3,730,804 and 3,879,247 to Dickey, 3,723,212 to Casper, 3,556,887 to Adcock et al., and 3,424,885 to Garney et al. In other examples the current is induced in other conductive materials, such as finely divided carbon particles or iron oxide applied to or sandwiched between thermoplastic materials, e.g., U.S. Pat. Nos. 4,264,688 to Balla, 3,730,804 and 3,879,247 to Dickey, 3,652,361, 3,462,336 and 3,396,258 to Leatherman, 3,574,031 to Heller, 3,367,808 to Edwards and 3,450,856 to Buck.

The package forming machines using induction heating to form transverse seals presently available cannot be adapted to operate fast enough to be economical and competitive because the electromagnetic field is generated by an induction coil that is electrically and directly connected to the high frequency generator. Furthermore, induction coils that operate continuously, for lengthy periods of time must also have a cooling means for preventing the coil from overheating, melting, and shorting the generator, e.g., a source of circulating water connected to and flowing through a hollow portion of the coil. The electrical and cooling connections restrict the movement of the induction coil. These machines are primarily limited to intermittent sealing, where the coil only moves toward and away from the polyfoil laminate, and slow reciprocation because the distance an induction coil can travel in the direction of travel of the polyfoil is limited by the length of the electrical and cooling connections, and the coil must return to the starting point for each seal. Consequently, any continuous production of sealed packages would be very slow, inefficient, and uneconomical.

Secondary induction coils generate electromagnetic fields by being subjected to a first electromagnetic field generated by a primary coil electrically connected to the generator, having a current induced, and using that inducted current to generate the second field. They are not directly connected to a high frequency generator. The problem with known secondary induction systems is that they were designed for soldering, brazing, or heat treating small parts such as capacitors or resistors. These methods use plate conductors that are mounted on turntables or translating frames to move the coil in and out of the primary coil's electromagnetic field. The known methods do not have the rigidness required to simultaneously exert pressure on and inductively heat the workpiece in cooperation with a pressing surface, nor the speed or control necessary to seal commercially available polyfoil materials. Furthermore, these secondary induction coils could never be used to compress the workpiece because of the severe damage that would result, e.g., shorting the generator, burning out the coil.

SUMMARY OF THE INVENTION

In order to overcome the problems inherent in traditional induction sealing techniques, and in particular to increase the production rate of sealed packages, secondary induction coils are used within a rigid jaw compressing a polyfoil tube filled with a product, to induce a current in the polyfoil and seal the tube transversely.

A plurality of secondary induction coils, electrically insulated from one another, from the primary induction coil connected to the high frequency generator, and from ground, are mounted on an endless carrying means arranged so that each secondary induction coil will be passed through the electromagnetic field generated by the primary inducion coil. Preferably the carrying means is a belt-like carrying means interposed between the primary induction coil and a traveling web of polyfoil materials. The traveling web may comprise two webs arranged so that two thermoplastic materials are opposing and superimposed, or it may comprise one web that has been folded and sealed longitudinally to form a tube having the thermoplastic as the inner surface.

The carrying means advances at the same speed as the polyfoil material and has one path segment ("Path A") where the movement of the carrying means is parallel to the traveling foil. The second induction coils, moving as part of the belt-like carrying means, advance at the same rate. The advance is preferably continuous. When moving along Path A, the secondary induction coil passes through the electromagnetic field generated by the primary induction coil, close to the surface of the primary induction coil.

Each secondary induction coil is mounted as a part of a nonconductive rigid sealing jaw. Each sealing jaw is mounted on the carrying means and has an opposing corresponding rigid pressure jaw mounted on a carrying means so that, as the carrying means advance, each sealing jaw and corresponding pressure jaw contact and compress the polyfoil tube. Preferably the pressure and sealing jaws are arranged on an endless belt-like carrying means so that both carrying means rotate continously in opposite directions and the sealing and pressure jaws move in the same direction while in Path A. In this path segment, the sealing jaw and pressure jaw contact and compress two portions of the polyfoil transversely from opposite sides of the polyfoil tube, expressing any product, so that the two thermoplastic materials are in contact and there is no relative movement between the sealing jaw, the pressure jaw, and the polyfoil material as they advance.

As each secondary coil passes through the electromagnetic field, one by one, an induced current flows in the area of the secondary induction coil subjected to the electromagnetic field. The secondary induction coil is designed to be responsive to the electromagnetic field generated by the primary induction coil. For example, when the electromagnetic field is generated by a pancake coil, the secondary induction coil may be an elongated twin loop folded over on itself to have a U-shape, longer than it is wide, so that one loop is fully subjected to the electromagnetic field.

The current induced in the secondary induction coil passes through all parts of the coil and consequently generates and radiates a second electromagnetic field. The second electromagnetic field would thus be generated by the induced current flowing through the other loop of the twin loop secondary induction coil.

The second electromagnetic field induces a second current in the area of the metallic foil layer contacted and compressed by the sealing jaw, proximate to the secondary induction coil located in the sealing jaw and thus subject to the second electromagnetic field. The second induced current causes the foil to heat because of resistance losses, and the heat will soften the adjacent thermoplastic materials. Because they are pressed together, the two thermoplastic layers will fuse.

When the secondary induction jaw is no longer subjected to the electromagnetic field generated by the primary induction coil, no current is induced, no second electromagnetic field is generated, and no heat is generated. This occurs when the carrying means advance and move the sealing jaw away from the surface of the induction coil. The fused thermoplastic material will then cool, harden, and form a seal. The sealing jaw and pressure jaw maintain the polyfoil materials pressed lightly together until the thermoplastic material has hardened. Thus, at the end of Path A, the pressure jaw and sealing jaw release the sealed polyfoil material as the carrying means advance to bring the jaws back to the beginning of Path A.

The preferred practice includes severing the seals after the thermoplastic materials have hardened with a knife mounted in the pressure jaw. The knife perforates the polyfoil in the sealed area and passes through a corresponding gap in the sealing jaw to sever polyfoil.

It is also preferred to have an alignment means for aligning the sealing jaw and the pressure jaw as they contact and compress the polyfoil. Such an alignment means may comprise a pair of ball studs mounted in the sealing jaw and a corresponding pair of sleeves mounted in the pressure jaw. The ball studs are received inside the sleeves when the polyfoil is compressed between the sealing jaw and pressure jaws, near the beginning of Path A. The alignment means thus prevents any twisting of the sealing and pressure jaws relative to each other when clamped about the polyfoil.

It is also preferred to utilize a means for preforming the tube at a location below where the seal wil be made and above where the preceding seal was made, preferably at about the midpoint of the package to be formed, and will occur before the pair of corresponding sealing and pressure jaws that will form the seal to be made contact and compress the polyfoil tube. The preforming step involves pressing in the edges of the polyfoil material about to be sealed to increase the volume enclosed by the material so that the tube is relatively more fully filled before the package is sealed. A second preforming means for preforming the package by prebreaking the scored and creased polyfoil tube may be provided at a location above the first preforming means to assist the first preforming means providing a more uniform fill.

It is therefore an object of this invention to provide a method and apparatus for sealing polyfoil materials together by induction, using a second induction coil not directly connected to a high frequency generator to receive electromagnetic energy and to generate an electromagnetic field on the area of the polyfoil to be sealed.

It is another object of this invention to provide a method and apparatus for sealing polyfoil laminate webs continuously, at a high rate of seals per minute.

It is another object of the invention to seal metallic foil and thermoplastic laminates by use of high frequency generators without requiring direct connection between the induction coil that induces the current in the metallic foil and the generator while the laminates are tightly pressed together and advancing continuously, and the secondary induction coils are advancing at the same speed as the laminate.

It is another object of this invention to provide a plurality of secondary induction sealing jaws and pressure jaws spaced apart for gripping two opposing sides of polyfoil material sequentially, one set of sealing and pressure jaws after another, preforming the polyfoil tube to expand the volume of the tube to be sealed, forming discrete sealed containers from a continuously forming and advancing tube of polyfoil material being filled with a product, inductively sealing the tube transversely, relative to the direction of travel of the tube, and severing the seals to make sealed containers, particularly aseptic sealed containers, at a high rate of speed.

DETAILED DESCRIPTION OF THE DRAWINGS

Figure 1:
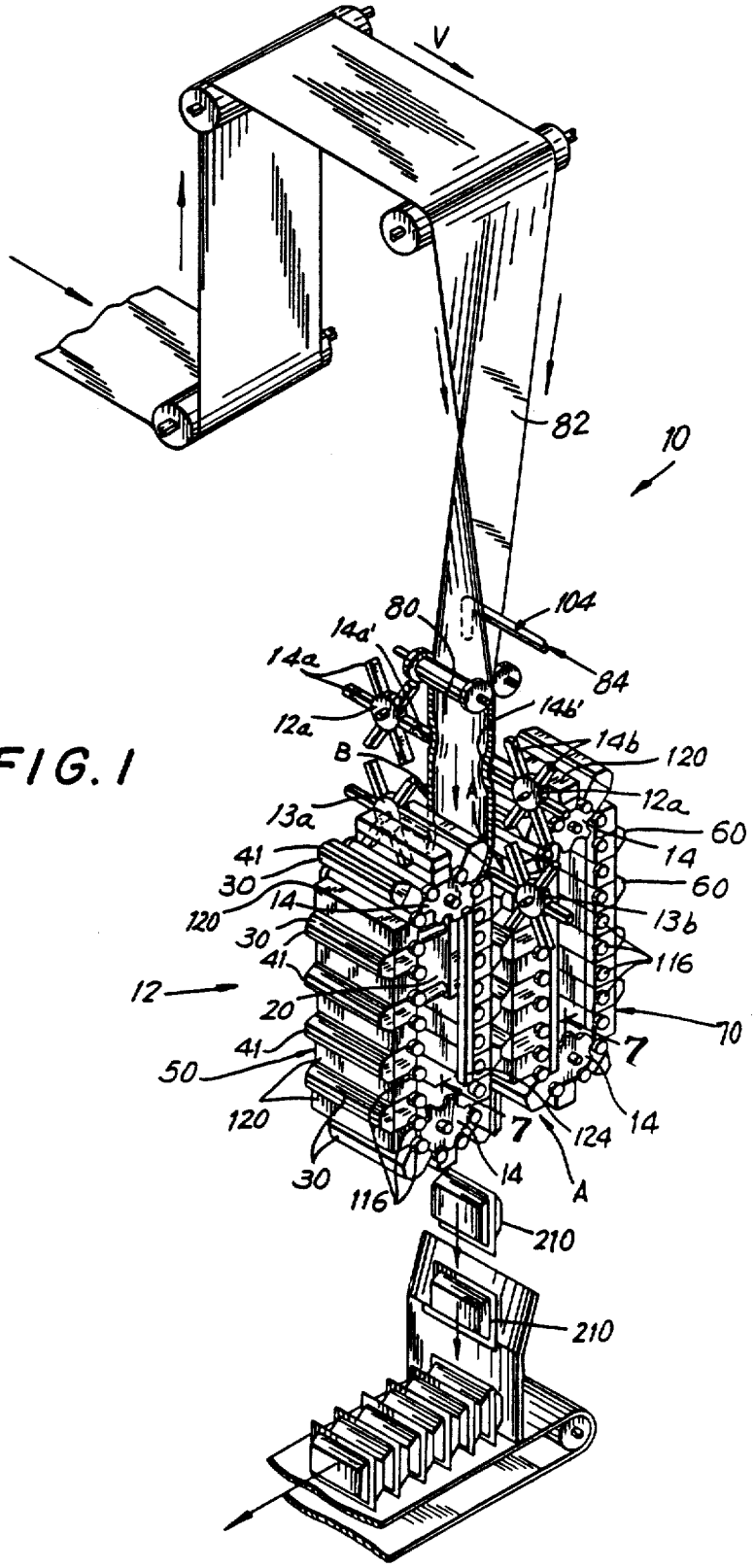
FIG. 1 illustrates a schematic perspective view of the continuous induction sealing apparatus in accordance with the present invention.

As shown in FIG. 1, an illustrative embodiment of this invention is useful in connection with machines 10 that form polyfoil tube 80 from polyfoil web 82, fills polyfoil tube 80 with product 84, preforms and seals polyfoil tube 80 transversely, and severs the seal to form discrete packages 210 containing relatively uniform amounts of product 84. The method of folding, filling, and vertically sealing web 82 to form filled tube 80 is known in the art.

Figure 2:
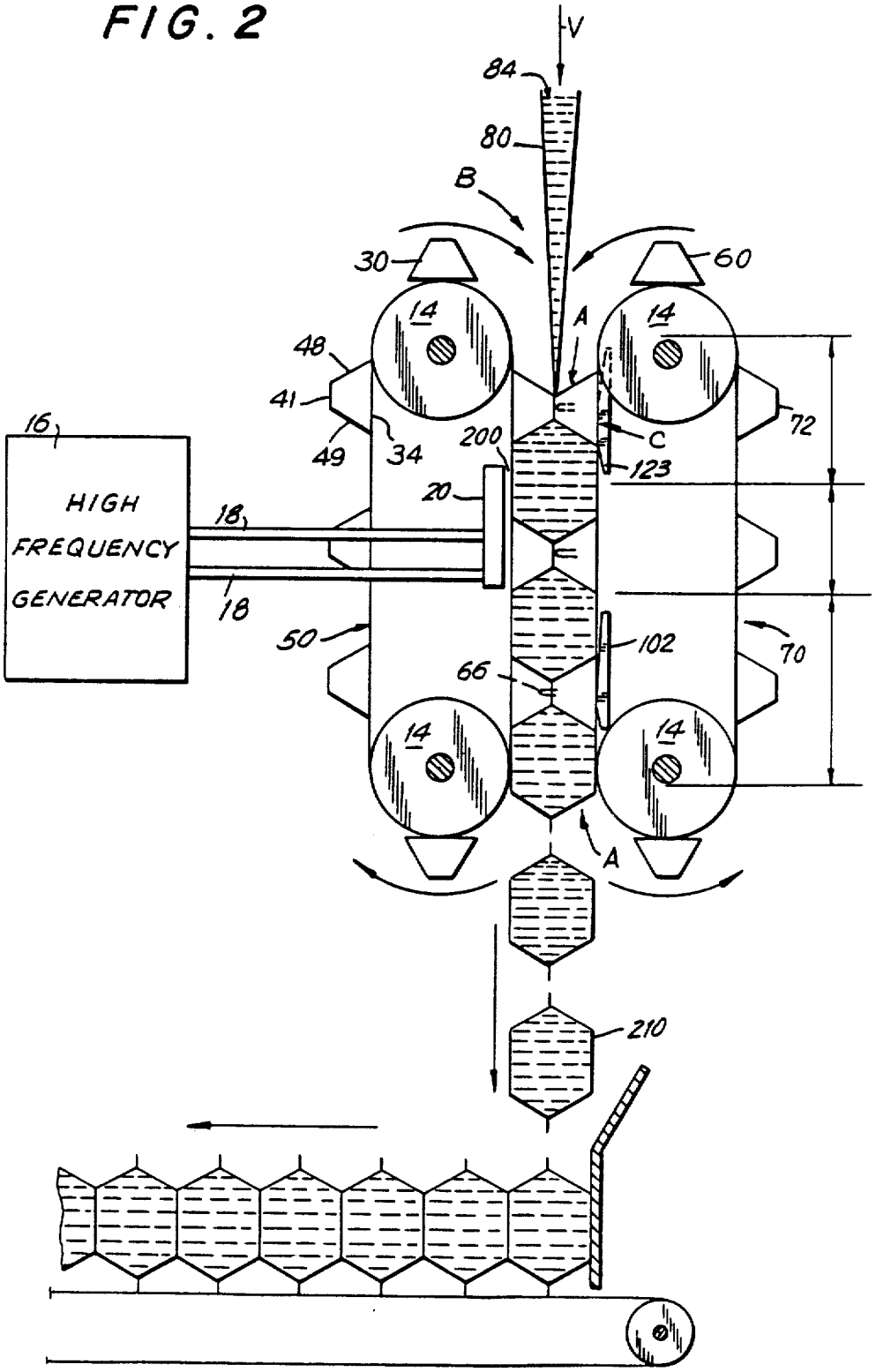
FIG. 2 illustrates a schematic front section view of the continuous induction sealing apparatus in accordance with the present invention.

As shown in FIGS. 1 and 2, an illustrative embodiment of the apparatus of this invention comprises high frequency generator 16, primary induction coil 20, [pluraity] *plurality* of secondary induction coils 32, plurality of sealing jaws 30, first endless carrying means 50, plurality of pressure jaws 60, second endless carrying means 70, top preforming wheels 12a and 12b, and bottom preforming wheels 13a and 13b. Sealing [3aws] *jaws* 30 are nonconductive and mounted on and spaced along first carrying means 50. Secondary induction coils 32 are mounted in sealing jaws 30. Pressure jaws 60 are mounted on and spaced along second endless carrying means 70.

Top preform wheels 12a and 12b having plurality of spokes 14a and 14b respectively, oppose each other and are mounted on opposite sides of tubes 80 so that one of spokes 14a of wheel 12a and one of opposing spoke 14b of wheel 12b contact the sides of tube 80 and press the opposing sides inwardly so that the tube 80 will expand and fill with product 84. If tube 80 has previously been scored and creased by means known to those in the art, then pressing the edges of tube 80 may also begin to form package 210 along the predetermined scored fold lines. The preform wheels also provide for proper registration of the printed matter on a formed package when the polyfoil is preprinted for package labeling. If the tube is not preformed, the corresponding sealing and pressure jaws might not grab polyfoil tube 80 at the place where the print for two adjacent packages meet. Thus part of the print for two packages may appear on the same package. Preforming can adjust the length of tube 80 so that the jaws can grab polyfoil tube 80 at the proper location, assisting in the print registration so that the print for a package is properly arranged on that package.

Preform wheels 12a and 12b are constructed and driven synchronously so that spokes 14a′ and 14b′ contact tube 80 at a location on the tube at about the same time. The location on tube 80 is preferably about the midpoint of the portion of tube 80 corresponding to a package, before tube 80 is contacted by sealing jaw 30 and pressure jaw 60. The speed at which preform wheels 12a and 12b rotate is adjusted to correspond to the speed of tube 80 so that one pair of spokes will preform tube 80 for each package to be made and there is minimal vertical relative movement between the end of the spokes and tube 80 during preforming.

Bottom preform wheels 13a and 13b, having respective plurality of spokes 15a and 15b, are similar to wheels 12a and 12b in construction, function, and alignment. Bottom preform wheels 13a and 13b are arranged in opposition and may be spaced below top wheels 12a and 12b preferably by about the length of two packages. Therefore, in the preferred embodiment each package formed will have been preformed by both top preform wheels 12a and 12b and bottom preform wheels 13a and 13b before being sealed transversely. In an alternate embodiment, only bottom preform wheels are used. In yet another embodiment, no preform wheels may be required depending on the operating speed and the nature of the polyfoil used, the size of the package, and the filling material.

First and second endless carrying means 50, 70 are arranged and driven synchronously so that in a part of their paths, Path A, first and second carrying means are in opposition on opposite sides of polyfoil tube 80, and are rotating in a plane perpendicular to the plane formed by top and bottom preform wheels 12a, 12b, 13a and 13b. As a section of polyfoil tube passes through the apparatus, top preform wheels 12a and 12b contact and preform tube 80, bottom preform wheels 13a and 13b contact and preform tube 80, each seal jaw 30 opposed a corresponding pressure jaw 60, transversely contacting and compressing between them preformed and filled polyfoil tube 80 so that the inner thermoplastic material is tightly pressed together. Sealing jaw 30, pressure jaw 60, and polyfoil tube 80 advance simultaneously at speed V, so that sealing jaw 30 passes and is subjected to the first electromagnetic field generated by primary induction coil 20, generates a second electromagnetic field, and subjects the metallic foil material of polyfoil tube 80 to the second electromagnetic field. This induces a current in the metallic foil, heating and softening and fusing together the pressed thermoplastic material. When sealing jaw 30 passes beyond and is no longer subject to the first electromagnetic field, no currents are induced in the thermoplastic material or secondary induction coil 32 and no heat is generated. The thermoplastic material then cools and hardens, forming a transverse seal. The longer the time period the heated polyfoil tube is permitted to cool while compressed between the sealing and pressure jaw, the more likely it is that the resulting seal will be hermetic. The more pairs of corresponding sealing and heating jaws the more packages having hermetic seals, or aseptic packages, can be made. Thus it can be seen how packages having transverse seals made in accordance with this invention can be produced in large quantities and at cost savings by continuously sealing at a high rate of speed.

For simplicity, the drawings will be described in connection with only one set of corresponding sealing jaw 30 and pressure jaw 60 as they proceed along Path A. It is to be understood however, that there may be more than one set of corresponding sealing jaw and pressure jaw, continuously advancing through each stage of the sealing operation, producing a plurality of transverse seals spaced apart along polyfoil tube 80.

FIG. 2 shows how primary induction coil 20 is electricaly connected to high frequency generator 16 by a pair of electrically conductive busbars 18. Busbars 18 typically are a solid conductor, e.g., copper or aluminum, and may be rigid or flexible. Alternately, the pair of busbars may be replaced with a coaxial cable to maximize the power transfer from the generator to the primary coil. High frequency generator [18] *16* is a commercially available induction frequency generator that can generate frequencies up to 450 KHz at about 5 kilowatts, e.g., 5 kw Lepel generator, model No. T53DFSW, type T50653, as may be purchased from Lepel Industries, New York, N.Y.

Figure 4:
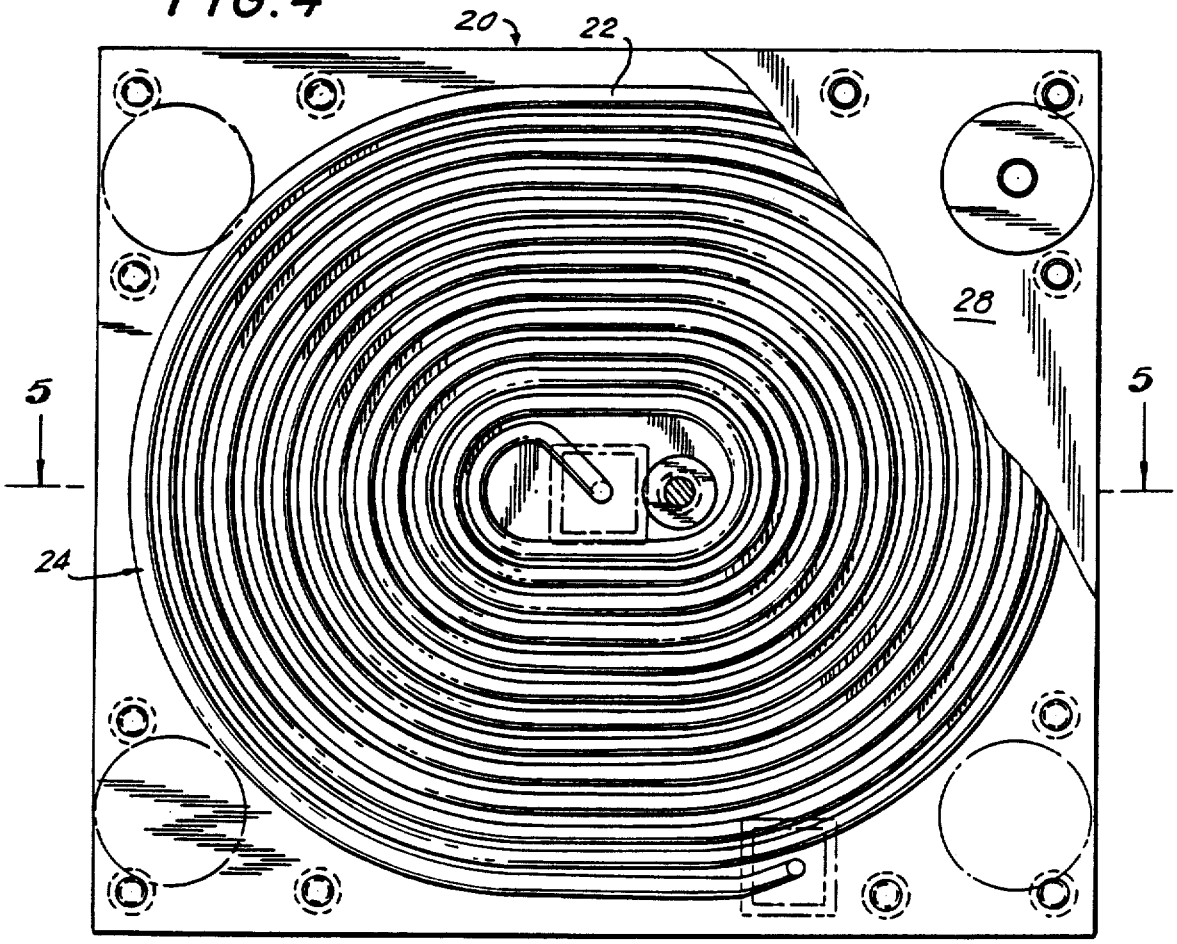
FIG. 4 is a sectional face view of the primary induction coil of FIG. 1.
Figure 5:
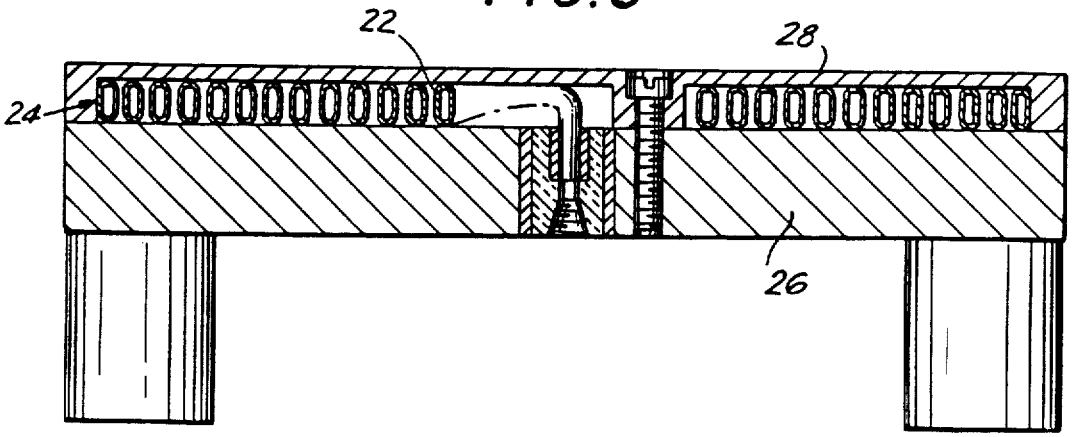
FIG. 5 is a top sectional view of FIG. 4 taken along lines 5—5.

FIGS. 4 and 5 show the construction of primary induction coil 20. Electrically conductive tubing 22, typically substantially of copper, is wound spirally into pancake coil 24. FIG. 5 shows how tubing 22 is hollow so that a source of water (not shown) can flow continuously through tubing 22 to absorb heat generated by resistance losses and thus cool pancake coil 24 during operation. Water cooling is common in the induction art. Tubing 22 is electrically connected in a conventional fashion to busbar 18 (not shown), completing the circuit, so that current will cycle through generator 16, busbars 18, and pancake coil 24. As current passes through tubing 22, a dynamic electromagnetic field is generated by pancake coil 24. The electromagnetic field is composed of an electronic field component, radiating outwardly from the surface of pancake coil 24, and a magnetic field component, radiating radially along the surface of coil 24. The strength of the fields decreases significantly with increasing distance from the surface. The effective electromagnetic field is substantially the magnetic field component located adjacent and in close proximity to the surface area of primary induction coil 20. The range of the effective electromagnetic field depends upon the power of generator 16 and the configuration of pancake coil 24. Pancake coil 24 is mounted on bulkhead 26, a material comprising Celcoa 2500 as available from Celanese Corporation, Celanese Engineering Resins, Chatham, N.J., having a high dielectric value of 1200 v/mil to insulate the first electromagnetic field from ground. Primary induction coil 20 also has cover 28 secured over the front surface area of pancake coil 24, for protecting the coil, preventing electrical shorts, and securing the coil rigidly in its pancake, spiral orientation.

Figure 3:
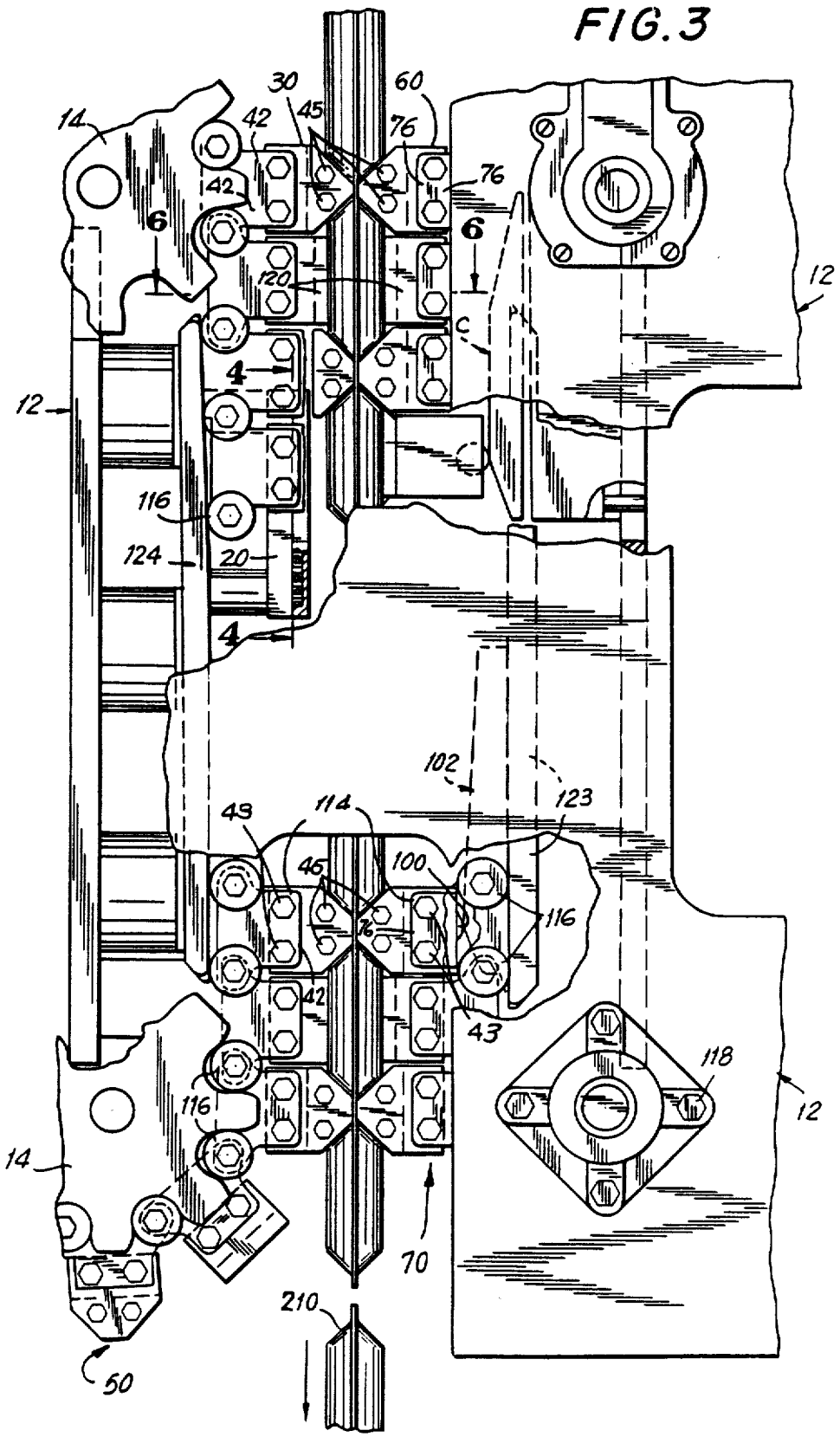
FIG. 3 is a sectional front view of FIG. 1.

FIGS. 1, 2, and 3 show how primary induction coil 20 is mounted relative to first endless carrying means so that sealing jaw 30 and pressure jaw 60 are opposing and contact and compress polyfoil tube 80 before sealing jaw 30 enters and is subject to the effective electromagnetic field generated by primary induction coil 20. As sealing jaw 30 enters and passes through the effective electromagnetic field, it acts as a significant load on primary induction coil 20 and generator 16, and a current is induced in secondary induction coil 32 of sealing jaw 30 having the same frequency as the current in primary induction coil 20.

Figure 6:
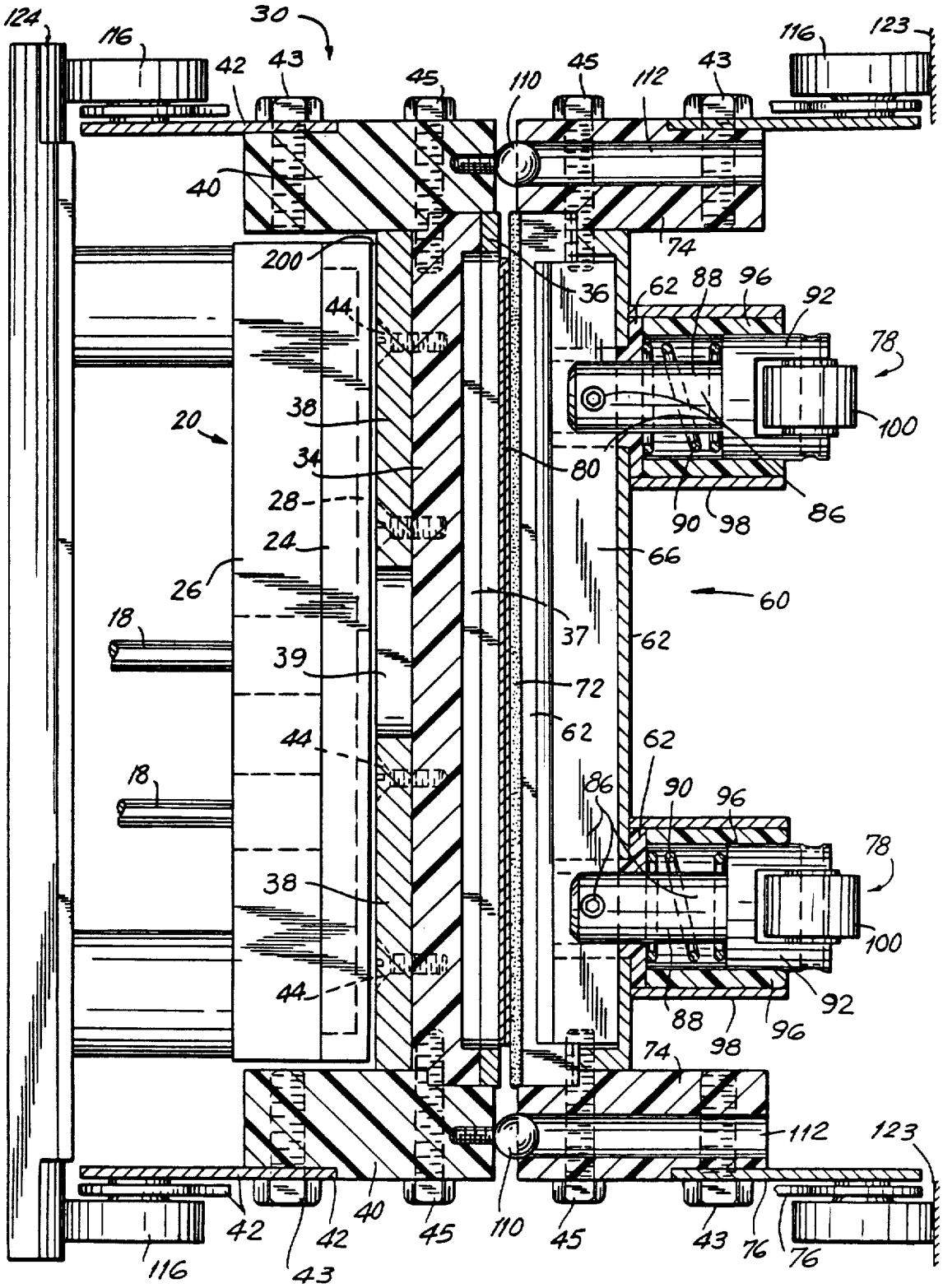
FIG. 6 is a partial top section view of FIG. 3 taken along line 6—6.

FIG. 6 shows the orientation of sealing jaw 30 relative to primary induction coil 20 when sealing jaw 30 is located in the effective electromagnetic field. Gap 200 between cover 28 and sealing jaw 30 is intended to be as small as possible. In practice, the size of the gap depends upon how efficiently the system is to be operated, how much vibration exists when carrying means 50 and 70 are advancing, how close machinery tolerances can be maintained, and the power of high frequency generator 16. A gap of about 0.063" has been used satisfactorily.

As shown in FIGS. 6, 7, 8, and 9, each sealing jaw 30 comprises electrically conductive secondary induction coil 32, typically 99% pure copper having thin loop 36 and thick loop 38, base 34, end portions 40, and brackets 42 for mounting sealing jaw 30 on endless carrying means 50.

Base 34 and end portions 40 are electrically nonconductive materials that isolate secondary *induction* coil 32 from ground yet are capable of withstanding the pressures required to compress, seal, and sever polyfoil tube 80. A typical material is G-10 or G-11 epoxy and fiberglass resin, commercially available from Synthane-Taylor, ALCO Standard Company, Valley Forge, Pa.

Figure 7:
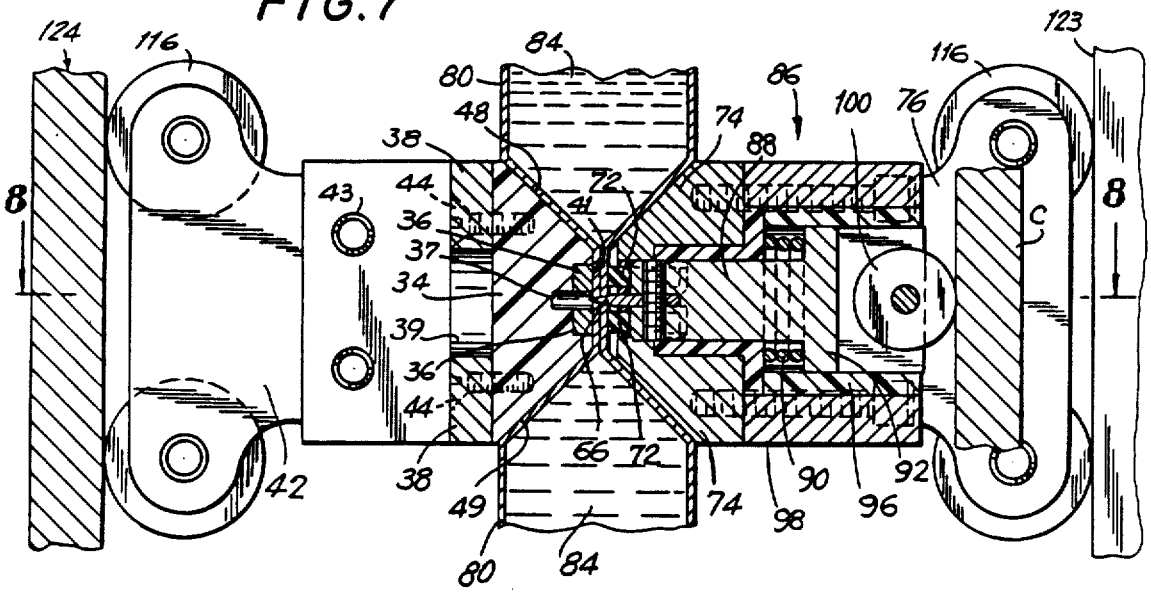
FIG. 7 is a partial front view of FIG. 1 taken along line 7—7.

Base 34 is adapted to receive coil 32 so that thin loop 36 is transverse to polyfoil tubing 80. Base 34 and end portions 40 have beveled faces 48 and 49, creating a trapezoidal-like cross section as shown in FIG. 7. The trapezoidal cross section permits sealing jaw 30 to engage and compress polyfoil tube 80 at sealing pressing surface 41 without entrapping any significant amount of product 84, as sealing jaw 30 is brought by B at the top of Path A and in contact with polyfoil tube 80 by first carrying means 50, as shown in FIG. 1.

Thin loop 36 is one piece of conductive material having thin gap 37 extending along most of its longitudinal midline. Thin loop 36 and thin gap 37 of this embodiment have been designed to have a plate-like configuration transverse to the direction of advance of polyfoil tube 80, thin gap 37 being longer than flattened tube 80 is wide to ensure a uniform transverse seal, and wide enough to receive a blade for severing the transverse seal. The face of thin loop 36 forms part of sealing pressing surface 41 and must be wide enough to conduct current at sufficient intensity to induce a current in the metallic layer of polyfoil tube 80 that will heat, and soften, and fuse the opposing thermoplastic layers of polyfoil tube 80 pressed transversely between sealing jaw 30 and pressure jaw 60, to form the seal. Similarly, the seal must be wide enough to retain its integrity after it is severed.

Thick loop 38 is designed to respond to the nature and orientation of the effective electromagnetic field generated by primary induction coil 20 to have a current induced in it as sealing jaw 30 traverses the effective electromagnetic field. Because secondary induction coil 32 is one piece, the induced current will be the same in both thick and thin loops 36, 38, and must be adequate to form the seal in polyfoil tube 80 as described above. [The action is such that a first current is induced in loop 38 by the primary field of coil 20, a second current is induced in loop 36, and a third current is induced in the electrically conductive layer of the packaging material.]

Figure 10:
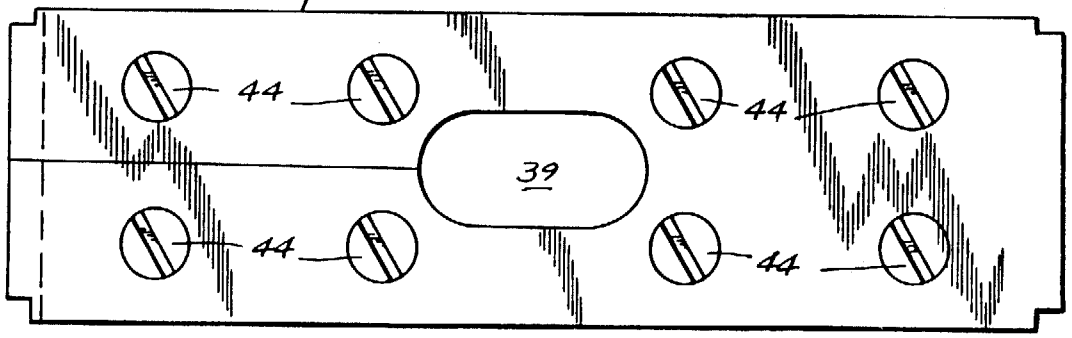
FIG. 10 is a rear view of the secondary induction coil of FIG. 9.

In the preferred embodiment, as shown in FIGS. 6 and 7, thick loop 38 resembles a thick, rectangular plate having oval 39 cut out of the center, and a slit extending longitudinally from the oval to one edge to form a single turn loop (see FIG. 10). The dimensions shown in FIGS. 6, 7, and 10 are representative of the functional, relative dimensions. For example, oval 39 is about 1.5 inches by 0.75 inches and the slit is about 0.015 inches. Preferred secondary induction coil 32 is one induction coil having two U-shaped loops of different configuration, the loops being about the same length arranged essentially in parallel and superimposed planes, connected together at the end having the slits corresponding to the open end of the U-shape. Secondary induction coil 32 is secured to base 34 by brass screws 44.

Thin loop 36, having the same current that is induced in thick loop 38, generates a second electromagnetic field, different from and more concentrated than that generated by primary induction coil 20. The second electromagnetic field has an electrical field component directed outwardly along the length of thin loop 36 and a magnetic field component perpendicular to and along the length of thin loop 36. The magnetic field consequently induces a current in the area of the metallic layer of polyfoil tube 80 parallel to the length of thin loop 36.

End portions 40 are secured to [ends 46 and 47 of] base 34 by screws 45. Brackets 42 are attached to end portions 40 by brass screws 43 for mounting sealing jaw 30 to first carrying means 50.

As shown in FIGS. 6, 7, 8, and 9, pressure jaw 60 comprises base 62, slot 64, knife 66, grooves 68, cushioning means 72, end pieces 74, brackets 76, and piston receptacles 78. Base 62 need not be electrically nonconductive, although it is preferred that base 62 be a material that is not readily susceptible to induction heating so that it will not act as a load on high frequency generator 16, e.g., stainless steel. Pressure jaw end portions 74 are made of an electrically nonconductive material e.g., G-10 or G-11, so that each pressure jaw 60 is electrically isolated from ground. Slot 64 extends longitudinally along and through pressure jaw 60 and is adapted to receive and pass knife 66. Knife 66 is used to perforate and sever sealed polyfoil tube 80 after the seal has formed. Grooves 68 extend longitudinally along the front of pressure jaw 60, one on either side of slot 64, and are adapted to receive cushioning means 72, a resilient nonstick material, e.g., rubber. Cushioning means 72 is pressed against polyfoil tube 80 to contact and compress but not stick to polyfoil tube 80 during and after forming and severing of the seal. Pressure jaw 60 and end portions 74 have beveled faces 48, 49, giving jaw 60 a trapezoidal-like cross section that is generally the mirror image of the cross section of sealing jaw 30, as both are shown in FIG. 7. This configuration permits pressure jaw 60 to contact and compress polyfoil tube 80 without entrapping any significant amount of product 84 between pressure jaw 60 and similarly contacting and compressing sealing jaw 30.

Attached to the rear of base 62 are a pair of piston receptacles 78, as shown in FIG. 6, each being adapted for receiving knife pushrod mechanism 86 for actuating knife 66. Knife pushrod mechanism 86 comprises cylinder 98, cylinder bearing 96 inserted within cylinder 98, preferably of a teflon-like material, pushrod 88 secured at one end to knife 66 having a first diameter and at the other end being attached to cylinder head 92 having a second diameter larger than the first diameter, adapted to slide smoothly in contact with cylinder bearing 96, and spring 90 secured about pushrod 88 and between the back of pressure jaw base 62 and cylinder head 92. Wheel 100 is pivotably mounted in the end of cylinder head 92 and is responsive to cam 102.

A pair of cams 102 are located on base 12 of machine 10, at the lower part of Path A. They are mounted in parallel horizontally, and in line with the path of wheels 100 so that as pressure jaw 60 moves downwardly, wheels 10 contact cams 102 at a location below where the seal has formed, and cams 102 cause knife pushrod mechanism 86 to translate, forcing knife 66 to contact, perforate, and sever polyfoil tube 80. Springs 90 maintain pushrod mechanisms [82] *86* biased against cams 102 so that when cams 102 cease to exert a pushing force on pushrod mechanism 86, pushrod mechanism 86 will retract knife 66 within pressure jaw 60, while sealing Jaw 30 and pressure jaw 60 maintain polyfoil tube 80 compressed.

Knife 66, knife pushrod mechanism 86, piston receptacles 78 and cams 102 are optional elements that facilitate handling of packages produced in large quantities at high rates of speed.

Figure 9:
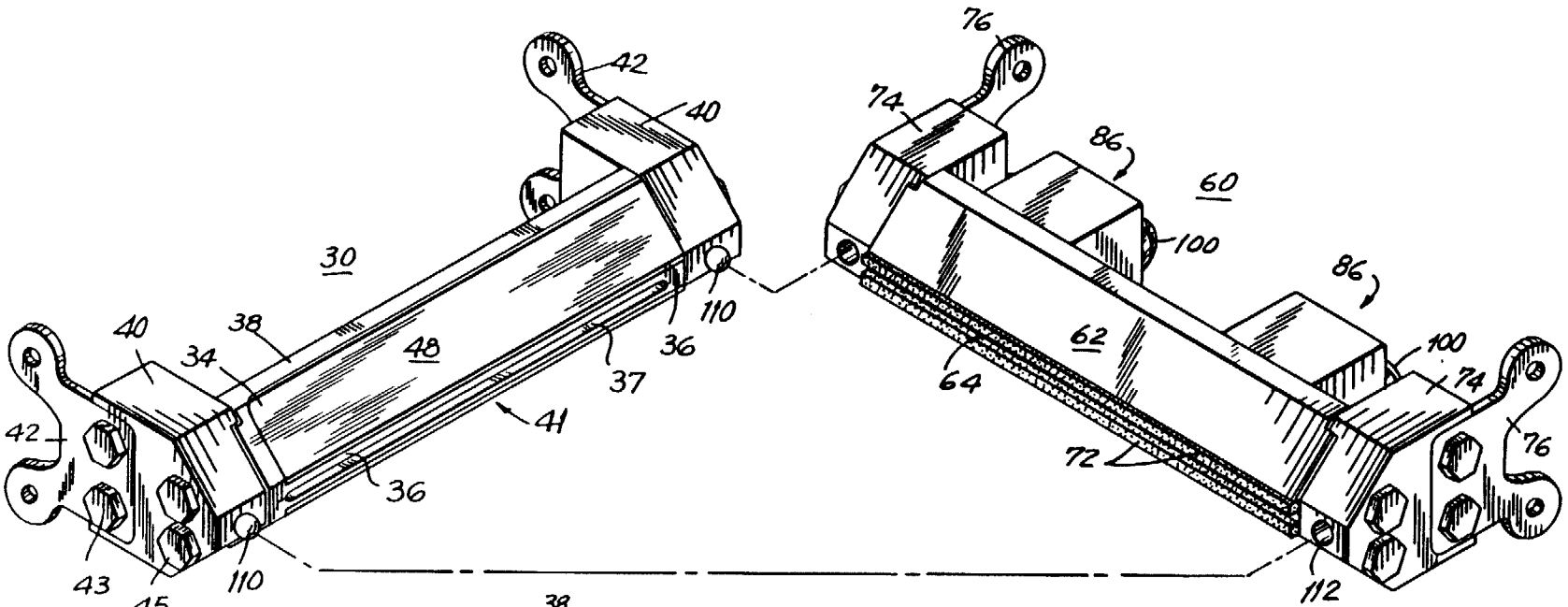
FIG. 9 is a perspective view of a secondary induction coil-sealing jaw and a pressure jaw in accordance with an embodiment of the present invention.

As shown in FIGS. 6 and 9, in the preferred embodiment sealing jaw 30 has ball studs 110 mounted in end portions 40, and pressure jaw 60 has corresponding sleeves 112 inserted into holes drilled in end portions 74. When sealing jaw 30 and pressure jaw 60 are brought in opposition at B, as shown in FIG. 1, ball studs 110 will enter and be retained in sleeves 112 so that thin gap 37 will align properly with corresponding slot 64 and knife 66 can extend from slot 64 into thin gap 37 without contacting any part of thin loop 36 or base 34. The ball stud and sleeve construction permits sealing jaw 30 and pressure jaw 60 to move towards and away from each other and to pivot into and out of opposition but will not permit them to twist relative to each other. This also provides that seal pressing surface 41 will squarely oppose resilient means 72 and form a uniform seal in polyfoil tube 80.

Figure 8:
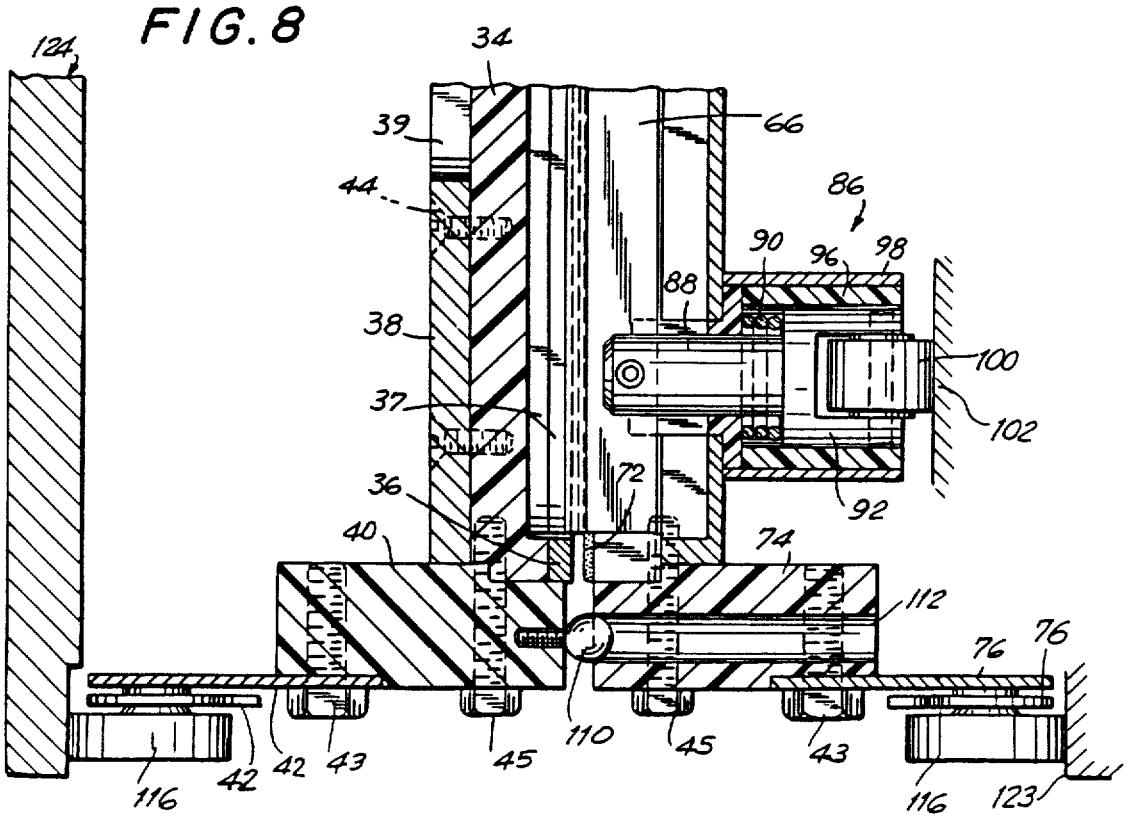
FIG. 8 is a top section view of FIG. 7 taken along line 8—8.

As shown in FIGS. 3, 7, and 8, endless carrrying means 50 and 60 are mirror images of each other and will therefore be discussed with regard to only one. Each endless carrying means comprises two movable endless chains 124 that are joined together when the sealing or pressure jaws are connected. Each chain 124 comprises a plurality of brackets [114] *42 or 76*, plurality of wheels 116, plurality of fill plates 120, and volume control tracks [122] *124*. Each chain 124 is mounted on a pair of sprockets 14, arranged at opposite ends of Path A, having drive means 118 connected to each sprocket 14 for rotating the sprocket and thus controlling the speed and tension of chains 124 to correspond to speed V of polyfoil tube 80.

Referring to FIGS. 7 and 8, it is seen how two wheels 116 are pivotally mounted to the lower end of bracket [114] *42 or 76*. Wheels 116 are adapted for retention in sprockets 14, for moving in and out of segment A, and for rolling along volume control tracks 122. The upper end of bracket [114] *42 or 76* is secured to either sealing jaw 30, pressure jaw 60, or a fill plate 120. Fill plates 120 are designed to provide a flat surface for preventing bulges in polyfoil tube 80 during the compressing and sealing operation and are alternated between jaws so that fill plate 120 on first carrying means 50 opposes fill plate 120 on second endless carrying means 70. [Preferably brackets 114 are the same as brackets 42 when used to secure sealing jaws 30 to first carrying means 50, and brackets 114 are the same as brackets 76 when used to secure pressure jaws to second carrying means 70.]

FIG. 3 shows how each wheel 116 is connected to two brackets [114], 42, or 76, thereby forming endless carrying means 50 and 70. Volume control tracks 122 are mounted on base 12 and are adjustable to control the distance between sealing jaws 30 and pressure jaws 60 and opposing fill plates 120, thereby supporting polyfoil tube 80 as product 84 is inserted into polyfoil tube 80 through filler tube 104, in accordance with the designed volume desired and dimensions of the tube. The means for adjusting the volume do not form a part of this invention.

Volume control tracks 122 also provide a support for wheels 116 so that sealing jaw 30 will not move away from polyfoil tube 80 when pressure jaw 60 is urged against polyfoil tube 80 and vice versa. In a preferred embodiment, volume control tracks 123 support pressure jaws 60 and have raised portion C that urges pressure jaw 60 towards sealing jaw 30 to tightly press polyfoil tube 80 transversely, so that product 84 is more fully expressed from between the two thermoplastic material layers to be sealed together.

Means for conveying severed packages may be provided as shown in FIGS. 1 and 2. Further means for forming the severed packages into desired shapes, for example, bricks, may also be provided (not shown). Neither of these means form a part of the invention.

The method and apparatus of sealing polyfoil tube 80 in accordance with the invention is described above, and below, in connection with the following example.

EXAMPLE

A test was performed using the apparatus substantially as described above. The high frequency generator was a 5KW Lepel generator. The polyfoil material used was manufactured by International Paper Company, New York, N.Y. The polyfoil was about 0.9 micrometers thick, and comprised the following layers with their respective density (where available): external layer of polyethylene (15 $g/m^2$); a layer of paper ($200 \pm 35$ $g/m^2$), a junction layer of polyethylene (20 $g/m^2$); a layer of aluminum foil; and an internal layer of polyethylene ($55 \pm 5$ $g/m^2$). The metallic foil layer was about 0.00035" thick. The web was originally 12" wide and after being folded in half was just less than 6" wide.

The primary induction coil, about 6.5 inches in diameter, was connected to the generator output by a coaxial cable, and connected to a water supply which provided water circulating through the hollow copper tubing. The sealing jaws, substantially as described above, were mounted on endless carrying chains that were mounted on sprockets driven by a microprocessor controlled drive mechanism for providing uniform speed control relative to the web speed.

The microprocessor also controlled the drive means for the top and bottom preforming wheels so that packages could be properly created at any selected speed. Furthermore, the microprocessor was used to adjust the power output of the high frequency generator to coincide with the speed at which the tube was advancing so that the secondary coil will receive enough energy to induce a large enough current for a time adequate to melt the thermoplastic layer of the polyfoil and form a hermetic seal. The speed and power relationship was predetermined by trial and error bench tests that established the correlation. The relationship was then used by the microprocessor which adjusted the generator power in response to the tube speed.

The secondary coil dimensions were based on the desire to minimize the generator power used by maximizing the current distribution and flow in the coil, without detracting from the structural integrity of the coil. The dimensions also control the secondary electromagnetic field generated by the coil because of the current distribution in the coil. It was determined that the preferred ratio of the surface area of the loop to the cross sectional area of the loop was about 3.9 for each of the thin loop and the thick loop. A ratio of 4 to 1 was examined but the thin loop would not be thick enough to carry the current without requiring some additional menas for cooling the secondary coil.

The secondary induction coil was about 7" long. The thin loop was about 0.25" wide and 0.152" thick, the thin gap about 0.125" wide, and the sealing pressing surface was about 0.43" wide. The thick loop was about 1.0" wide and [187] *0.187"* thick and had a concentric oval aperture about 1.5" by 0.75" arranged so that the long axis was parallel to the length and the short axis was perpendicular. A thin slit about 0.015" wide extended from one end of the coil to the oval, forming the rectangular plate-like structure into a single loop about 2" wide. (See FIG. 10.) The distance between the two loops was about 0.631" and two tapered pieces of conductor connected the thick and thin loops together at the ends of the loops having the slits so that the induced current would flow through both loops of the secondary coil. The center distance between adjacent sealing jaws (and pressure jaws) was 4.187 inches.

The plurality of sealing jaws and pressure jaws were advanced, with the sealing jaws passing the primary induction coil, one after the other, downwardly, about 0.063 inches from the front surface of the primary coil. The pressure jaws then passed the cams activating the knife to sever the filled and sealed containers. Both jaws then returned to the top to form another seal, as shown in FIGS. 1 and 2.

A conventional double unwind stand and butt splicer, type SHD-800ABR-EG, purchased from Compensating Tension Controls, Inc., West Caldwell, N.J., contained two rolls of polyfoil web. The web was guided over guide rollers that maintained the web in tension and folded the web in half so that the thermoplastic material layer was on the inside. A filler tube was placed into the folded section and the longitudinal sealing means sealed the overlapping edge of the web continuously as the web advanced, thus forming the polyfoil tube.

The web guiding, folding, longitudinal sealing, and filling do not form a part of this invention. However, the longitudinal seal means included an induction coil for heating the longitudinal seal area by induction. Pressure to form the seal was provided by separate pressing means. The induction coil was connected to a Linberg-/Cycledyne 3 KW high frequency induction generator having a nominal frequency of 450 KHz and operated at about 30–35% power. The generator is commercialy available from Linberg/Cycledyne Company, Chicago, Ill.

Web speed used in the test runs was about 46.5 feet per minute. This speed produced 125 packages per minute and each package contained about 250 ml of fluid.

The filling section filled the tube with water, and maintained the water level within a range that could accommodate the repeated compression of the polyfoil tube as it was formed and new seals were being made without rising to the longitudinal seal area.

The top and bottom preforming wheels were aligned on opposite sides of the advancing tube and rotated at a speed so that a spoke would contact the tube and expand the volume to more fully fill the tube with water.

The sealing jaws and pressure jaws were aligned in opposition to contact the polyfoil tube filled with water, using ball studs mounted in the sealing jaw entering the sleeves inserted in the pressure jaw to ensure alignment.

From prior experiments it has been learned that in the absence of the alignment means, some of the sealing jaws could be damaged by the severing action the knife. While the damage did not necessarily relate to imperfect seals, adding the alignment means significantly reduced the likelihood of damage to the secondary induction coil, and prolonged the life of the machine.

The sealing jaw and pressure jaw pressed the sides of the preformed polyfoil tube inwardly, displacing the water level upwardly and ensuring that the envelope below the sealing jaw was completely filled with water. The opposing jaws moved downwardly at a rate of 46.5 feet per minute, equal to the speed of the polyfoil tube. After an initial compression, the pressure jaw was urged towards the sealing jaw to more completely express the water from the seal area, and to press the thermoplastic material layers, transversely flat against each other. A pressure of 45 psi was used. It was found that lower pressure could be used, especially at slower speeds of web advance, to provide regular complete seals, but leaks might form and the forces required by the knife to sever the sealed packages (about 60 psi) could break or weaken the seal.

The strength of the electromagnetic field is dependent upon the output of the generator. The 5 KW Lepel high frequency generator parameters were as follows: power setting at 60%, KC (grid modulating frequency) at 90, grid current of 0.4 Amps-DC, plate current of 1.15 Amps-DC, and Tap (impedance matching of primary coil) at 15. The distance between the sealing jaw and the primary coil was 0.063 inches. The sealing jaw took 2.86 seconds to pass by the primary induction coil, traveling a distance of 6.5 inches. During that time, a first current of unknown magnitude was induced in the secondary induction coil and a second current of unknown magnitude was induced in at least one of the metallic foil layers of the polyfoil tube, heating the metallic foil by resistance losses and the adjacent facing thermoplastic layers by conduction, so that the facing thermoplastic layers softened and fused into one mass. The actual frequency produced by the primary coil was about 425 KHz.

Once having passed beyond the primary induction coil, no significant current was induced in either the secondary induction coil or the metallic foil layer. This permited the fused thermoplastic to solidify and form a hermetic seal while pressed between the jaws. Two seals were formed, each about 0.25" wide, with a gap inbetween wide enough to be severed by the knife without breaching either of the seals. The two seals generally corresponded to the surface area of the thin loop of the secondary induction coil in the pressing surface. Bench tests had determined that if a slower tube speed or greater generator power had been used, the seal area might have comprised one seal rather than two discrete seals.

This test ran for 30 minutes without any significant failure in transverse seals. During this time, the secondary induction coils reached a steady state temperature of 140° F.

We claim:

1. A method of sealing packaging material having a layer of thermoplastic material and a layer of electrically conductive material comprising:

(a) compressing the packaging material together between first and second rigid members so that a first thermoplastic material portion is pressed against a second thermoplastic material portion with no relative motion between the first and second rigid members and the first and second thermoplastic material portions, the first and second rigid members being electrically isolated from ground and the first rigid member having an electrically conductive material on its surface [which contacts the packaging material and which is in the form of a first loop and also having a second electrically conductive material in the form of a second loop, said first and second loops being separated by a rigid, nonconductive material];

(b) generating a [primary] *first* electromagnetic field having an effective range for inducing a current in an electrically conductive material brought within the effective range;

(c) inducing from said [primary] *first* electromagnetic field a first current in the [second] electrically conductive material [loop] of the first rigid member by moving the first rigid member into the effective range of said [primary] *first* electromagnetic field thereby generating a second electromagnetic field from the first current flowing in the [second] electrically conductive [loop] *material* of the first rigid member[,] ;

(d) inducing from the second electromagnetic field of the [second loop] *electrically conductive material of the first rigid member* a second current in the [first loop thereby generating a third electromagnetic field] *electrically conductive material layer of said packaging material portion*;

(e) fusing the first and second thermoplastic material portions together by inducing from the [third] *second* electromagnetic field [of the first loop a third] *said second* current in said electrically conductive material layer of the packaging material for a period of time sufficient to generate enough heat as a result of the induced current flow to soften and fuse together the first and second thermoplastic material portions without adversely affecting the packaging material and;

(f) solidifying the heated thermoplastic material into an effective seal after it fused together by removing the first rigid member from the effective range of the first electromagnetic field so that no significant induced currents flow, no heat is generated, and the thermoplastic material is allowed to cool and harden.

2. The method of claim 1, further comprising:

advancing the first and second rigid members and the packaging material continuously, at the same rate of speed, so that the first rigid member passes through the effective range of the first electromagnetic field while the packaging material is compressed between the first and second rigid members; and adjusting the speed at which the first and second rigid members and packaging material move and adjusting the strength of the first electromagnetic field so that the first rigid member is within the effective range of the first electromagnetic field for a period of time long enough to soften and fuse the facing thermoplastic materials without adversely affecting the packaging material.

3. The method of claim 2, further comprising:

preforming the packaging material before the packaging material is compressed between the first and second rigid members so that the volume formed by the packaging materials is increased.

4. The method of claim 2 further comprising;

securing the first rigid means to a first endless carrying means and securing the second rigid means to a second endless carrying means;

driving the first and second endless carrying means synchronously so that during each revolution the first and second rigid members contact and compress between them the portions of the packaging materials to be sealed together before the first member passes through the effective range of the first electromagnetic field; and releasing the sealed packaging materials after the thermoplastic material has cooled and hardened.

5. The method of claim 4 further comprising:

securing a plurality of first rigid means to and spaced apart along a first endless carrying means and securing a plurality of second rigid means to and spaced apart along a second endless carrying means, so that each first rigid member has a corresponding second rigid member, and each adjacent set of first and second rigid members contact and compress adjacent portions of packaging material to be sealed sequentially, along the length of the advancing packaging material.

6. The method of claim 5 further comprising:

generating the first electromagnetic field by means of a primary induction coil located interior to the first endless carrying means and electrically connected to a high frequency induction generator.

7. The method of claim 6 further comprising:

forming a tube continuously from an advancing web of packaging material by folding the packaging material so that the thermoplastic layer is folded on itself, inserting a product filler tube in the folded packaging material and sealing the folded packaging material longitudinally, below where the filler tube is inserted;

filling the tube of packaging material with a product as the tube advances;

arranging the first and second endless carrying means on either side of the advancing tube so that the first and second rigid members express the product from between the thermoplastic layers as they contact and compress the sides of the packaging material tube.

8. The method of claim 7 further comprising:

compressing the advancing tube of packaging material with the first and second rigid members transverse to the direction of advance of the tube; and severing the packaging material in the area sealed with a knife contained within the second rigid means after the thermoplastic material has hardened but before the first and second rigid means release the packaging material so that separate packages are formed from the packaging material having seals transversely to the tube and containing substantially uniform amounts of product.

9. The method of claim 8 further comprising:

preforming the advancing tube of packaging material by pressing the sides of the tube inwardly with preforming means before the advancing tube is compressed transversly so that the volume of the tube is increased and more product is introduced into the tube and enveloped in the package.

10. The method of claim 1 further comprising:

aligning the first and second rigid means by a ball stud attached to the first rigid member and a sleeve inserted in the second rigid member so that the ball stud enters and is retained within the sleeve when the first and second rigid members have contacted and compressed the packaging material.

* * * * *